United States Patent
Omura

(10) Patent No.: US 10,045,517 B2
(45) Date of Patent: Aug. 14, 2018

(54) ATTACHMENT TUBE FOR TOP GUIDE, TOP GUIDE FOR FISHING ROD, AND FISHING ROD

(71) Applicant: FUJI KOGYO CO., LTD., Shizuoka-shi (JP)

(72) Inventor: Kazuhito Omura, Shizuoka (JP)

(73) Assignee: FUJI KOGYO CO., LTD., Shizuoka-shi (JP)

( * ) Notice: Subject to any disclaimer, the term of this patent is extended or adjusted under 35 U.S.C. 154(b) by 0 days.

(21) Appl. No.: 15/312,089

(22) PCT Filed: Apr. 24, 2015

(86) PCT No.: PCT/JP2015/062528
§ 371 (c)(1),
(2) Date: Nov. 17, 2016

(87) PCT Pub. No.: WO2015/182309
PCT Pub. Date: Dec. 3, 2015

(65) Prior Publication Data
US 2017/0086436 A1    Mar. 30, 2017

(30) Foreign Application Priority Data

May 30, 2014 (KR) .......................... 10-2014-0066029

(51) Int. Cl.
*A01K 87/04* (2006.01)
(52) U.S. Cl.
CPC .................................... *A01K 87/04* (2013.01)
(58) Field of Classification Search
CPC ..................................................... A01K 87/04
(Continued)

(56) References Cited

U.S. PATENT DOCUMENTS

| 4,196,537 | A | * | 4/1980 | Ohmura | ................. | A01K 87/04 |
|  |  |  |  |  |  | 43/24 |
| 4,334,379 | A | * | 6/1982 | Nelli | ...................... | A01K 87/04 |
|  |  |  |  |  |  | 43/24 |

(Continued)

FOREIGN PATENT DOCUMENTS

| CN | 101185430 A | 5/2008 |
| CN | 101849531 A | 10/2010 |

(Continued)

OTHER PUBLICATIONS

International Search Report dated Aug. 4, 2015 in PCT/JP2015/062528 filed Apr. 24, 2015.

*Primary Examiner* — Lisa L Tsang
(74) *Attorney, Agent, or Firm* — Oblon, McClelland, Maier & Neustadt, L.L.P.

(57) ABSTRACT

An attachment tube for a top guide has a central axis extending in a longitudinal direction, a first insertion opening provided at one end in the longitudinal direction, a rectangular second insertion opening provided at the opposite end in the longitudinal direction, and an inclined surface provided at the opposite end. A tip portion of a fishing rod is inserted to the first insertion opening. An insertion leg of a frame supporting a guide ring is inserted to the second insertion opening. A rectangle center of the second insertion opening is spaced upward apart from the central axis. The inclined surface adjoins the second insertion opening and is inclined at an acute angle with respect to the central axis.

14 Claims, 18 Drawing Sheets

(58) Field of Classification Search
USPC .................................................... 43/24, 25
See application file for complete search history.

(56) References Cited

U.S. PATENT DOCUMENTS

| | | | | |
|---|---|---|---|---|
| 5,361,529 | A | * | 11/1994 | Lindler .................. A01K 87/04 43/24 |
| D368,295 | S | * | 3/1996 | Mata ........................... D22/143 |
| 5,901,492 | A | | 5/1999 | Ohmura |
| 5,941,013 | A | * | 8/1999 | Ohmura ................ A01K 87/04 43/24 |
| D532,073 | S | * | 11/2006 | Lin .............................. D22/143 |
| 2015/0201594 | A1 | | 7/2015 | Kawamura et al. |

FOREIGN PATENT DOCUMENTS

| | | | |
|---|---|---|---|
| CN | 202184058 U | | 4/2012 |
| FR | 2087106 A5 | * | 12/1971 |
| JP | 9-131148 A | | 5/1997 |
| JP | 09131149 A | * | 5/1997 |
| JP | 10210894 A | * | 8/1998 |
| JP | 3093986 B2 | | 10/2000 |
| JP | 3998132 B2 | | 10/2007 |
| JP | 2010-148523 A | | 7/2010 |
| JP | 2014-18152 A | | 2/2014 |
| KR | 1992-0008273 Y1 | | 11/1992 |
| KR | 1997-0004019 Y1 | | 4/1997 |

* cited by examiner

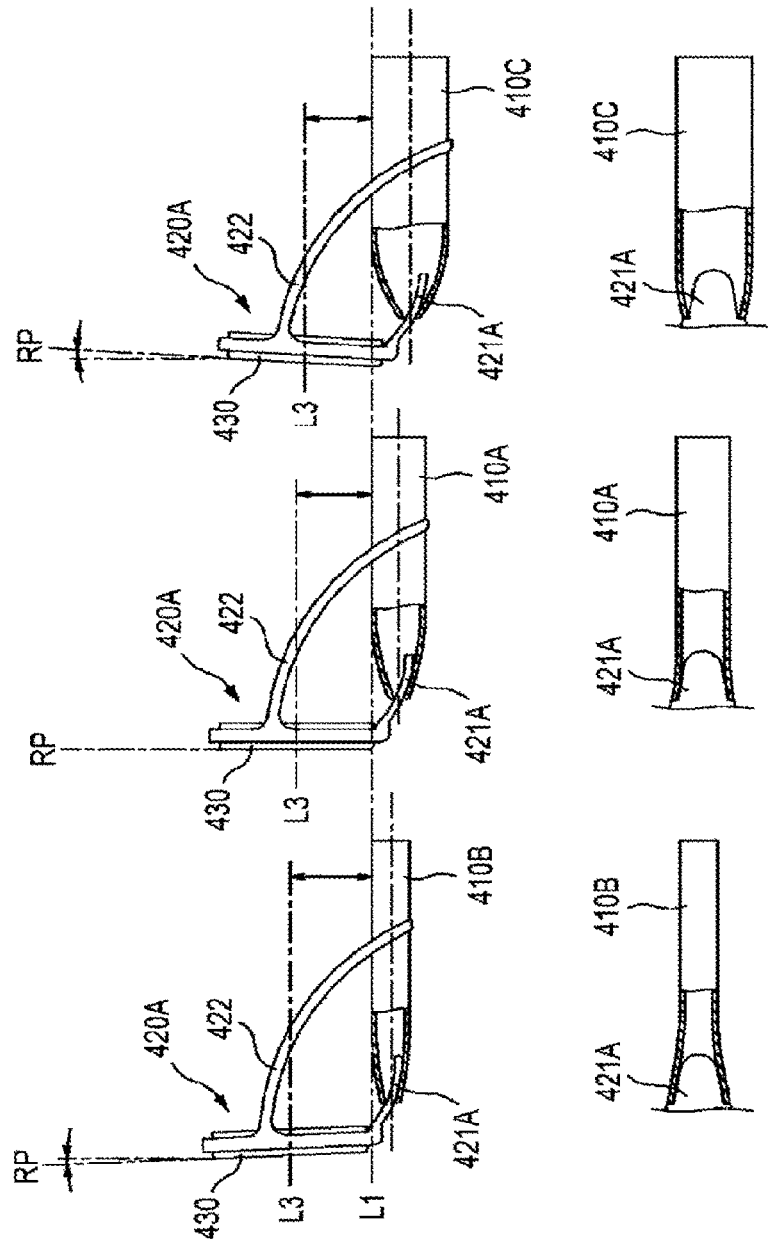

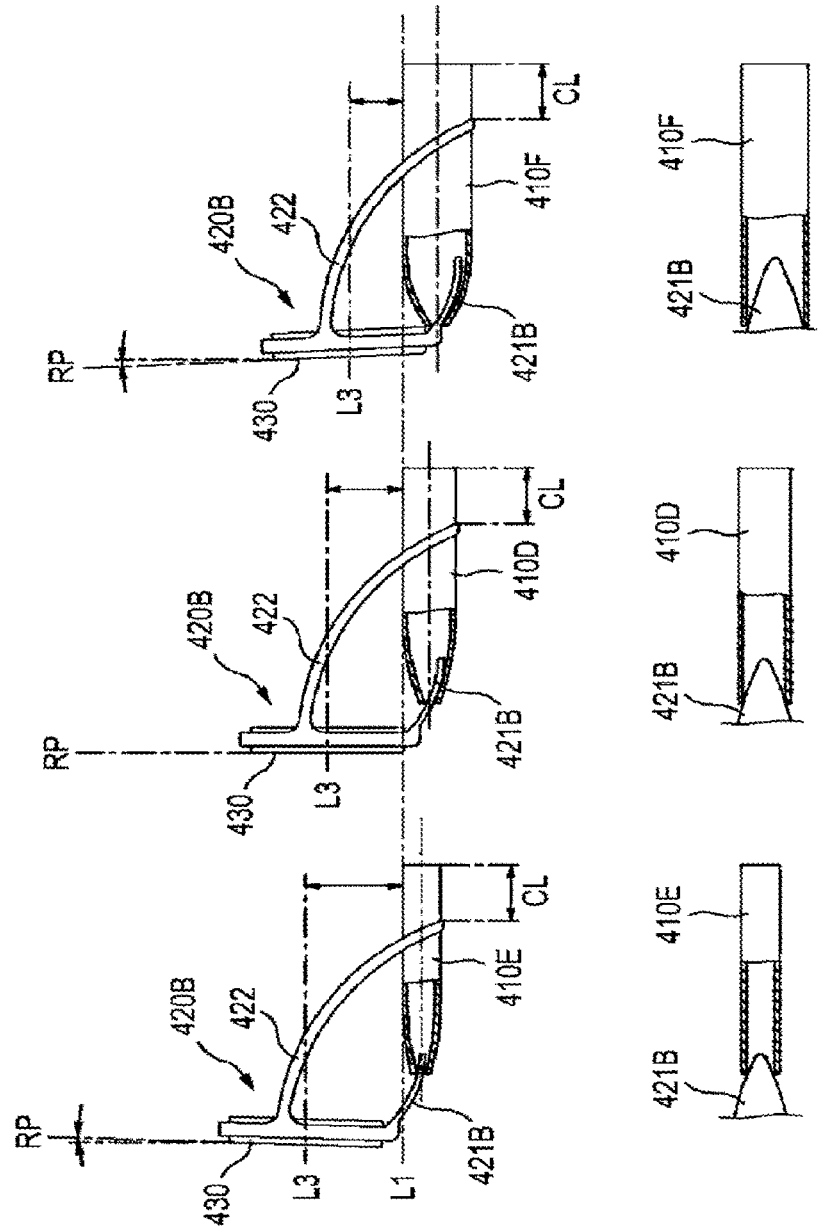

ATTACHMENT TUBE FOR TOP GUIDE, TOP GUIDE FOR FISHING ROD, AND FISHING ROD

CROSS-REFERENCE TO RELATED APPLICATIONS

This application is a 35 U.S.C § 371 national stage filing of International Application No. PCT/JP2015/062528, filed on Apr. 24, 2015, which claims the benefit of Korean Patent Application No. 2014-0066029, filed on May 30, 2014, the entire contents of each of which are incorporated by reference herein.

TECHNICAL FIELD

The present disclosure relates to an attachment tube for a top guide and a top guide which are attached to a tip of a fishing rod. Further, the present disclosure relates to a fishing rod including an attachment tube for a top guide or a top guide.

BACKGROUND

A fishing line guide is attached to a fishing rod to guide a fishing line, which is unwound from a reel or wound around the reel again, along the fishing rod. The fishing line guide has a guide ring, through which a fishing line passes, and a frame which is attached to a fishing rod and supports the guide ring. The frame of the fishing line guide is generally made of a metallic material.

A plurality of fishing line guides are attached to a fishing rod along a longitudinal direction of the fishing rod. A fishing line guide, which is located at a tip of the fishing rod among such fishing line guides, is referred to as a top guide. Generally, a rod body of the fishing rod is manufactured by means of carbon fibers or glass fibers. To protect an end portion at the tip of the rod body of such a fishing rod, the top guide is attached to a tip portion of the fishing rod in such a way that the tip portion of the fishing rod is inserted to the top guide. Japanese Patent Application Publication No. (Hei)9-131148 (Patent Document 1) discloses an example of the aforementioned top guide.

Patent Document 1: Japanese Patent Application Publication No. (Hei)9-131148

SUMMARY

To improve a flying distance of a fishing rig, an accuracy in casting a fishing rig, a fishing sensitivity, etc., a height of a center of a guide ring, an inner diameter of the guide ring, an inclination angle of the guide ring, etc. should be considered.

The top guide has an attachment tube to which the tip portion of the fishing rod is inserted, and a frame which is coupled to the attachment tube and supports the guide ring. A tip of the attachment tube of the top guide is provided with an insertion opening, and the frame is provided with an insertion leg which is inserted to the insertion opening. Further, the frame which needs to be strong is provided with the insertion leg and a support leg which makes contact with the attachment tube. As such, the top guide has the attachment tube and the frame which are made separately. According to usage examples of the top guide, various attachment tubes, which have various inner diameters for purposes of application to fishing rods having various diameters, are used, but the frame can come in one size and may be mounted to the aforementioned various attachment tubes.

FIGS. 24 and 25 show a usage example of top guides of a prior art. FIG. 24 shows that the aforementioned one-sized frame 420A is mounted to attachment tubes 410A, 410B and 410C having various outer diameters, and FIG. 25 shows that another one-sized frame 420B is mounted to attachment tubes 410D, 410E and 410F having various outer diameters.

Referring to FIG. 24, if the aforementioned frame 420A is mounted to the attachment tube 410C having a large inner diameter for a large-diameter fishing rod, when compared with the case where the frame 420A is mounted to the attachment tube 410A, a guide ring 430 is inclined toward a butt of the fishing rod, and a height from a surface of the attachment tube 410C to a center of the guide ring 430 (a distance between a straight line L1 and a straight line L3 in FIG. 24) becomes small. In contrast, if the aforementioned frame 420A is mounted to the attachment tube 410B having a small inner diameter for a small-diameter fishing rod, when compared with the case where the frame 420A is mounted to the attachment tube 410A, the guide ring 430 is inclined toward a tip of the fishing rod, and a height from a surface of the attachment tube 410B to the center of the guide ring 430 (a distance between the straight line L1 and the straight line L3 in FIG. 24) becomes large.

Referring to FIG. 25, as the one-sized frame 420B is mounted to the attachment tubes 410D, 410E and 410F having various outer diameters, the guide ring 430 is inclined toward the tip or butt of the fishing rod, and heights from the surfaces of the attachment tubes 410D, 410E and 410F to the center of the guide ring 430 (distances between the straight line L1 and the straight line L3 in FIG. 25) also change. In particular, in the top guides having the frame 420B shown in FIG. 25, the contact position of a tip of a support leg 422 to the attachment tube deviates from the central axis of the attachment tube in each top guide. Thus, as for the top guide having the frame shown in FIG. 25, it is difficult to use attachment tubes having a common length, and in some cases, an attachment tube longer than necessary must be used. By way of example shown in FIG. 25, it is preferable that lengths between the tip of an insertion leg 421B and one end of the attachment tube (a length denoted by a symbol CL in FIG. 25) are constantly maintained. Thus, the length of the attachment tube may be shortened in the attachment tube 410E having a small inner diameter, but, in comparison with the attachment tube 410E having a small inner diameter, the length of the attachment tube must be lengthened in the attachment tube 410D having a normal inner diameter and the attachment tube 410F having a large inner diameter. The lengthened length of the attachment tube as described above leads to increase in the weight of the top guide. Further, the insertion leg 421B and the support leg 422 of the frame 420B must be longer than necessary. This is very disadvantageous in the weight reduction of the top guide.

That is, in the usage example shown in FIG. 24 where the frames 420A having the same size are mounted to various attachment tubes 410A, 410B and 410C having different outer diameters, or in the usage example shown in FIG. 25 where the frames 420B having the same size are mounted to various attachment tubes 410D, 410E and 410F having different outer diameters, the inclination angles of the guide rings 430 on the attachment tubes, the heights from the surfaces of the attachment tubes 410A to 410F to the center of the guide ring 430, etc. are not constantly maintained due to the attachment tubes 410A to 410F having different outer diameters. Further, unintended inclination occurs at the guide ring 430, thus increasing the likelihood of the occurrence of entanglement of a fishing line. Further, a range permitting the passage of the fishing line is narrowed due to the inclination of the guide ring 430, thus increasing the likelihood that the fishing line does not pass through the guide ring 430 with ease. The reason why the same-sized frames 410A, 420B are not maintained at the same position when the same-sized frames 410A, 410B are mounted to the various attachment tubes having different outer diameters as described above is that the dimensions of various attachment tubes 410A to 410F are different for applicable fishing rods notwithstanding the fixed lengths of the insertion leg 421A, 421b and the support leg 422.

As a measure for solving the positional instability of the frame when the same frame is used for various attachment tubes, it can be considered to design a large number of frames which are exclusively used for the respective attachment tubes having different inner diameters. However, such a measure gives burden to the makers of fishing line guides since various frames suitable for the respective attachment tubes must be developed, and gives disadvantage to the makers since a manufacture cost of a fishing line guide increases.

Embodiments disclosed in the present disclosure solve the aforementioned problems of the prior art. Some embodiments of the present disclosure provide an attachment tube for a top guide and a top guide for a fishing rod, which are capable of constantly maintaining the position of the frame irrespective of various diameters of the fishing rod.

Further, some embodiments of the present disclosure provide a fishing rod including the aforementioned attachment tube for a top guide or the aforementioned top guide.

One aspect of the present disclosure provides an attachment tube for a top guide. An attachment tube for a top guide according to an exemplary embodiment includes a central axis extending in a longitudinal direction, a first insertion opening provided at one end in the longitudinal direction, a quadrilateral second insertion opening provided at an opposite end located opposite the one end in the longitudinal direction, and an inclined surface provided at the opposite end. A tip portion of a fishing rod is inserted to the first insertion opening. An insertion leg of a frame which retains a guide ring is inserted to the second insertion opening. A quadrilateral center of the second insertion opening is spaced upward apart from the central axis. The inclined surface adjoins the second insertion opening and is inclined at an acute angle with respect to the central axis.

In an embodiment, when the attachment tube is viewed from the side, an edge in a direction in which the center of the second insertion opening is spaced apart from the central axis is straight.

In an embodiment, the acute angle of the inclined surface is 25 degrees or more and 45 degrees or less. In an embodiment, a length between the one end and an apex point of an edge of the inclined surface which is located opposite an edge adjoining the second insertion opening is 60% or more and 95% or less of a length between the one end and the opposite end.

In an embodiment, the second insertion opening is rectangular. In an embodiment, when the attachment tube is viewed from the front, a distance between both short sides of the second insertion opening is greater or less than an inner diameter of the attachment tube.

Another aspect of the present disclosure provides a top guide for a fishing rod. A top guide for a fishing rod according to an exemplary embodiment includes: a frame including a ring retaining portion retaining a guide ring through which a fishing line passes, and an insertion leg extending from the ring retaining portion; and the above-described attachment tube for a top guide.

In an embodiment, when the top guide is viewed from the side, the insertion leg of the frame extends from the ring retaining portion at the same angle as the acute angle of the inclined surface of the attachment tube.

In an embodiment, the frame further includes at least one support leg, which extends from the ring retaining portion and makes contact with an outer surface of the attachment tube. In one embodiment, the support leg makes contact with the outer surface of the attachment tube in a direction in which the center of the second insertion opening is spaced upward apart from the central axis of the attachment tube.

A further aspect of the present disclosure provides a fishing rod including the above-described attachment tube for a top guide or the above-described top guide.

According to the attachment tube for a top guide, the rectangle center of the second insertion opening to which the insertion leg of the frame is inserted is spaced apart from the central axis of the attachment tube toward the outer surface. Thus, in the attachment tubes having various outer diameters, the distances between the center of the second insertion opening and the outer surface of the attachment tube are the same and the heights from the attachment tube to the center of the guide ring are the same. Thus, the same frames can be maintained at the same position in various attachment tubes having various outer diameters. Further, since the same frames are provided at the same position in the attachment tubes having various outer diameters, a frame having a short insertion leg and a short support leg can be designed and a top guide reduced in weight can be achieved. Further, according to the top guide, the attachment tube includes the inclined surface which is inclined at an acute angle with respect to the central axis, and the insertion leg of the frame is inclined at the approximately same angle as the acute angle of the inclined surface. Thus, when the top guide is viewed from the side, the inclined surface and the insertion leg are interconnected smoothly, effectively preventing the entanglement of a fishing line.

BRIEF DESCRIPTION OF THE DRAWINGS

FIG. 24 shows in parallel top guides of a prior art wherein the same frame is mounted to attachment tubes having various outer diameters.

FIG. 25 shows in parallel top guides of a prior art wherein another same frame is mounted to attachment tubes having various outer diameters.

DETAILED DESCRIPTION

Figure 1:
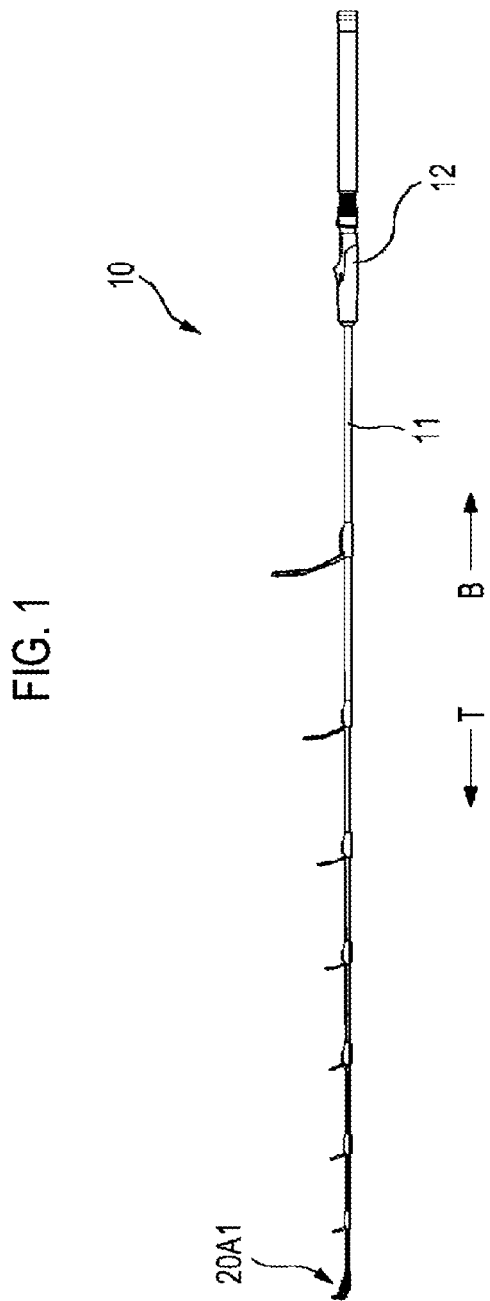
FIG. 1 is a side view showing a fishing rod according to one embodiment which includes a top guide according to one embodiment.
Figure 2:
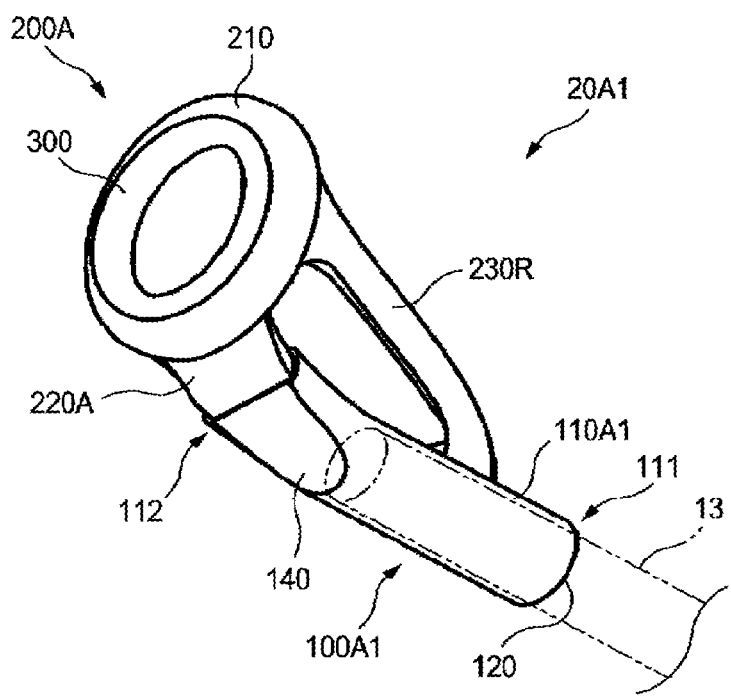
FIG. 2 is a perspective view showing a top guide according to one embodiment.
Figure 3:
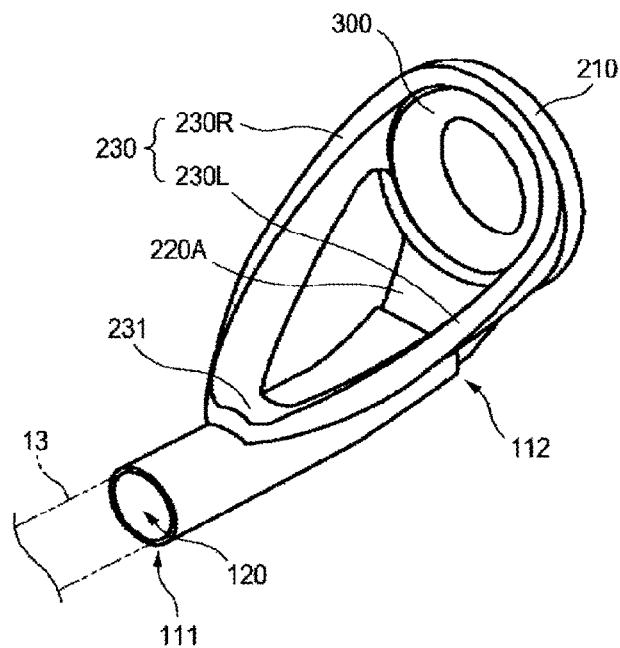
FIG. 3 is a perspective view showing the top guide shown in FIG. 2 in another direction.

Descriptions are made as to embodiments of an attachment tube for a top guide, a top guide and a fishing rod according to the present disclosure with reference to the accompanying drawings. In the drawings, like reference numerals denote like or corresponding elements or parts. The directional term "upward," "upper" or the like as used herein is based on a direction in which a ring retaining portion retaining a guide ring is positioned with respect to an attachment tube, while the directional term "downward," "lower" or the like as used herein means a direction opposite to the upward or upper direction.

A fishing rod according to one embodiment is described with reference to FIG. 1. In FIG. 1, an arrow T indicates a tip of a fishing rod, while an arrow B indicates a butt of a fishing rod.

A fishing rod 10 according to one embodiment has a thin and elongated rod body 11 which has a cylindrical shape. The rod body 11 has a tapering shape such that it becomes gradually thinner toward the tip. The rod body 11 of the fishing rod consists of a single rod or a plurality of partial rods. If the rod body 11 consists of a plurality of partial rods, the partial rods are connected in a put in type, a put over type, a telescopic type or the like. The fishing rod 10 has a reel seat 12 for attachment of a reel (not shown) in the vicinity of its butt. Further, the fishing rod 10 includes a top guide 20A1 according to one embodiment, which is attached to a tip portion of the rod body 11 and guides a fishing line at the tip of the fishing rod 10. Hereinafter, said tip portion of the rod body 11 is referred to as the tip portion of the fishing rod. If the rod body 11 consists of a single rod, the tip portion of the fishing rod includes the tip portion of said single rod. If the rod body 11 consists of a plurality of partial rods, the tip portion of the fishing rod includes the tip portion of the partial rod which is located at the tip.

FIGS. 2 to 22 show various embodiments of a top guide which is attached to the fishing rod. The top guides 20A1 to 20B3 according to the embodiments shown in FIGS. 2 to 22 are attached to the tip portion 13 of the fishing rod. The top guides 20A1 to 20B3 according to the embodiments include an attachment tube 100A1 to 100C, and a frame 200A, 200B. The attachment tube 100A1 to 100C is for attachment to the tip portion 13 of the fishing rod 10. The frame 200A, 200B retains a guide ring 300 through which a fishing line passes, and is coupled to the attachment tube 100A1 to 100B3. The attachment tube 100A1 to 100C and the frame 200A, 200B of the top guide 20A1 to 20B3 are made of a metallic material. The attachment tube 100A1 to 100C includes a tubular body to which the tip portion 13 of the fishing rod is inserted. The top guide 20A1 to 20B3 is attached to the rod body 11 by inserting the tip portion 13 of the fishing rod 10 to the tubular body of the attachment tube 100A1 to 100C and bonding, for example, the tubular body and the tip portion 13 of the fishing rod 10 together.

FIGS. 5 to 12B show various examples of the attachment tube constituting the top guide according to an embodiment. An example of the attachment tube of the top guide is described with reference to FIGS. 2 to 6.

The attachment tube 100A1 comprises a tubular body 110A1. The tip portion 13 of the fishing rod 10 is inserted to the tubular body 110A1. The tubular body 110A1 has a cylindrical shape wherein a bore is formed longitudinally such that the tubular body 110A1 receives the tip portion 13 of the fishing rod 10 therein. Thus, the attachment tube 100A1 includes a central axis CA which extends in the longitudinal direction of the tubular body 110A1 while passing a center of a circular cross section of the tubular body 110A1, one end 111 in the longitudinal direction, and an opposite end 112 located opposite the one end 111 in the longitudinal direction. When the attachment tube 100A1 is attached to the tip portion 13 of the fishing rod 10, the one end 111 of the attachment tube 100A1 faces the butt of the fishing rod 10.

A first insertion opening 120 which is circular is provided at the one end 111 of the attachment tube 100A1. The tip portion 13 of the fishing rod 10 is inserted to the inside of the tubular body 110A1 through the first insertion opening 120. The coupling between the attachment tube 100A1 and the fishing rod 10 is made by interposing, for example, an adhesive between an inner circumferential surface of the tubular body 110A1 and an outer circumferential surface of the tip portion 13 of the fishing rod, and inserting the tip portion 13 from the one end 111 of the attachment tube 100A1 toward the opposite end 112.

The attachment tube 100A1 includes a second insertion opening 130A, which is a quadrilateral, at the opposite end 112. The frame 200A of the top guide 20A1 is attached to the attachment tube 100A1 by inserting a portion of the frame 200A (an insertion leg of the frame 200A) to the inside of the tubular body 110A1 through the second insertion opening 130A. When the attachment tube 100A1 is viewed from the front, the second insertion opening 130A may have a quadrilateral shape such as a square or a rectangle. In one embodiment, the second insertion opening 130A has a quadrilateral shape with rounded corners. In another embodiment, the rounded extent of the corner in the quadrilateral shape of the second insertion opening 130A may differ from that shown in FIG. 6. The quadrilateral shape of the second insertion opening may include a quadrilateral shape with two right-angled sides.

Figure 6:
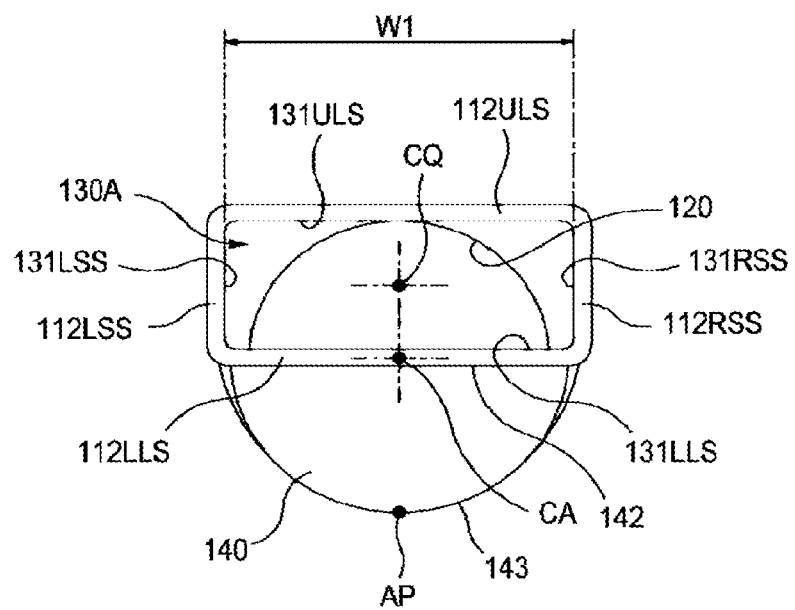
FIG. 6 is a front view of the attachment tube shown in FIG. 2.
Figure 7A:
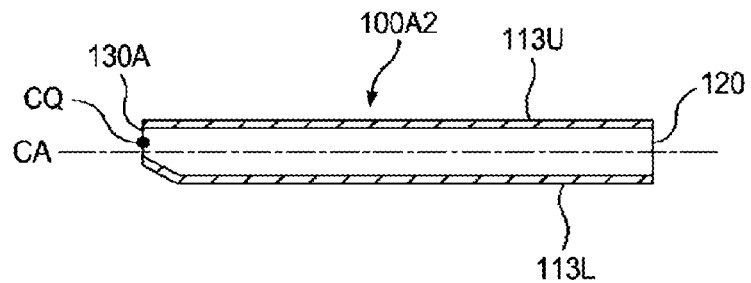
FIG. 7A is a longitudinal sectional view showing another example of an attachment tube.
Figure 7B:
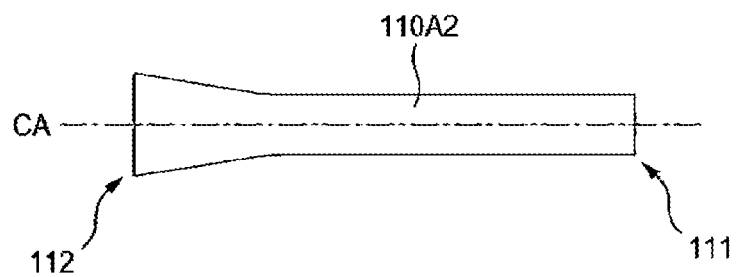
FIG. 7B is a top view of the attachment tube shown in FIG. 7A.
Figure 8A:
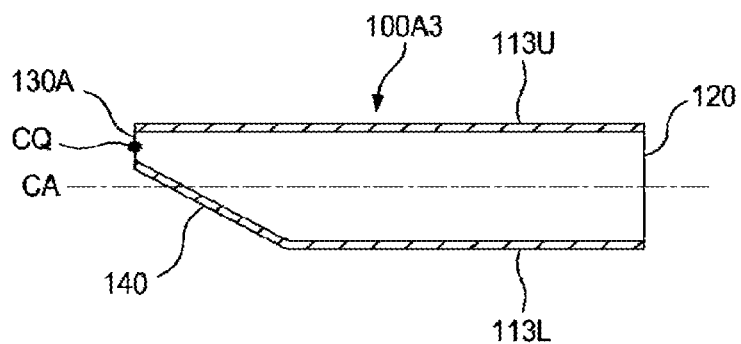
FIG. 8A is a longitudinal sectional view showing yet another example of an attachment tube.
Figure 8B:
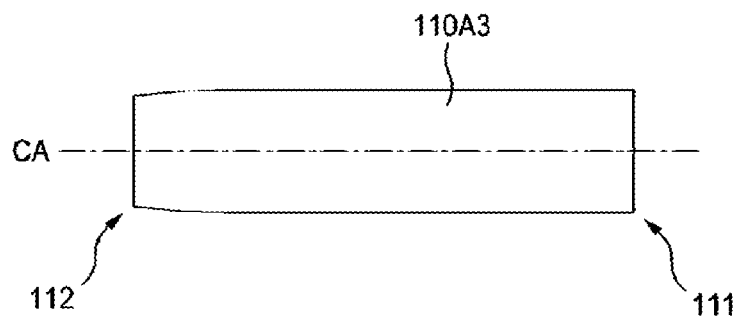
FIG. 8B is a top view of the attachment tube shown in FIG. 8A.

In this embodiment, the second insertion opening 130A has a rectangular shape. Specifically, as shown in FIG. 6, when the attachment tube 100A1 is viewed from the opposite end 112 (when the attachment tube 100A1 is viewed from the front), the second insertion opening 130A has a rectangular shape. The second insertion opening 130A is formed in the opposite end 112 such that a plane forming the rectangular shape of the second insertion opening is positioned perpendicularly to the central axis CA. Further, the second insertion opening 130A is formed in the opposite end 112 such that the short sides of the rectangular shape are positioned perpendicularly to the central axis CA. The second insertion opening 130A has a rectangle center CQ, an upper long side 131ULS, a lower long side 131LLS, a left short side 131LSS, and a right short side 131RSS. Since the second insertion opening 130A is positioned perpendicularly to the central axis CA in the opposite end 112, the opposite end 112 has side portions defining the respective sides of the second insertion opening 130A. That is, the opposite end 112 has an upper long side portion 112ULS, a lower long side portion 112LLS, a left short side portion 112LSS, and a right short side portion 112RSS. The inner edges of the upper long side portion 112ULS, the lower long side portion 112LLS, the left short side portion 112LSS and the right short side portion 112RSS define the long and short sides of the second insertion opening 130A respectively. When the attachment tube 100A1 is viewed from the front, widths of the long side portions 112ULS, 112LLS and the short side portions 112LSS, 112RSS are approximately equal to a thickness of the tubular body 110A1 or slightly narrower than the thickness of the tubular body 110A1.

Figure 5:
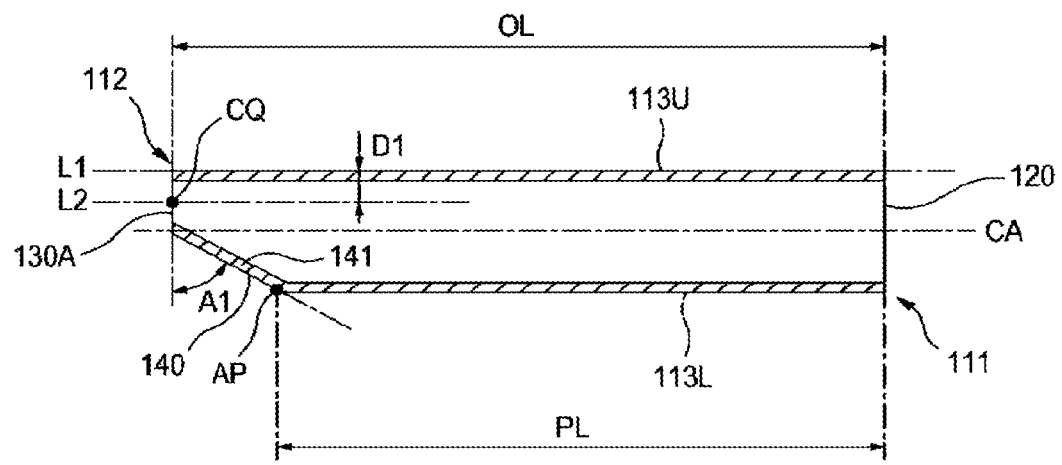
FIG. 5 is a longitudinal sectional view of an attachment tube shown in FIG. 2.

As shown in FIGS. 5 and 6, the rectangle center CQ of the second insertion opening 130A is spaced apart from the central axis CA. Specifically, the rectangle center CQ of the second insertion opening 130A is spaced upward apart from the central axis CA. That is, a straight line L2, which passes the rectangle center CQ of the second insertion opening 130A and is parallel with the central axis CA, is located between the central axis CA and a straight line L1 parallel with the central axis CA. The straight line L1 is located on an outer surface of the attachment tube 100A1 (an outer surface of the tubular body 110A1) in a direction in which the rectangle center CQ of the second insertion opening 130A is spaced apart from the central axis CA. When the attachment tube 100A1 is viewed from the side, the straight line L1 passes an upper edge. Further, the outer edge of the upper long side portion 112ULS of the opposite end 112 may be located under the straight line L1 or on the straight line L1. In this embodiment, as shown in FIGS. 5 and 6, the inner edge of the upper long side portion 112ULS of the opposite end 112 is the upper long side 131ULS of the second insertion opening 130A (the long side distant from the central axis CA among two long sides of the second insertion opening 130A), and the outer edge of the upper long side portion 112ULS of the opposite end 112 is located on the straight line L1. Thus, when the attachment tube 100A1 is viewed from the side, an upper edge 113U of the attachment tube 100A1 in the direction in which the center CQ of the second insertion opening 130A is spaced apart from the central axis CA forms an approximately straight line.

Figure 4:
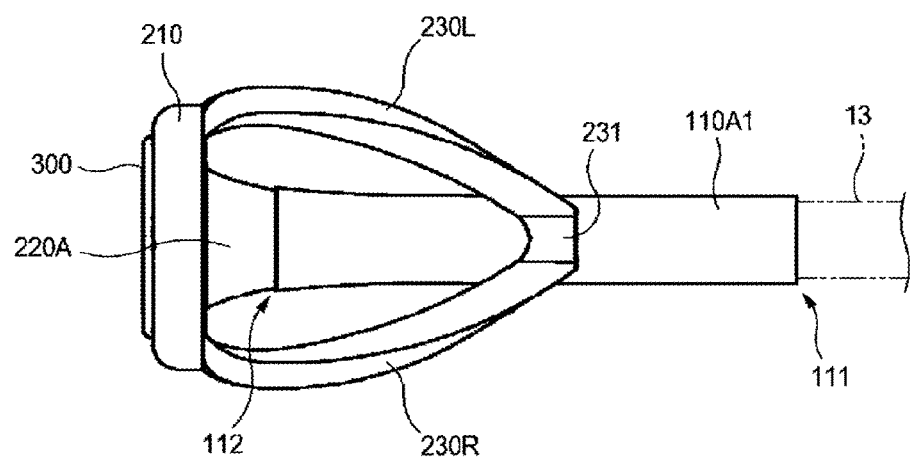
FIG. 4 is a top view of the top guide shown in FIG. 2.

Further, in this embodiment, as shown in FIGS. 5 and 6, the lower long side 131LLS of the second insertion opening 130A (the long side close to the central axis CA among two long sides of the second insertion opening 130A) is located above the central axis CA. As shown in FIG. 4, when the attachment tube 100A1 is viewed from the top, the width of the tubular body 110A1 becomes gradually wider toward the opposite end 112. Thus, as shown in FIG. 6, the left short side 131LSS and the right short side 131RSS of the second insertion opening 130A are located outside the outer surface of the cylindrical portion of the attachment tube 100A1. That is, when the attachment tube 100A1 is viewed from the front, a width W1 of the second insertion opening 130A, which is defined as a distance between the left short side 131LSS and the right short side 131RSS, is greater than inner and outer diameters of the tubular body 110A1 (inner and outer diameters of the attachment tube 100A1).

The attachment tube 100A1 includes, at the opposite end 112, an inclined surface 140 which adjoins the second insertion opening 130A. The inclined surface 140 is an outer surface of an inclined surface portion 141 which is formed by a portion of the attachment tube 100A1 which is adjacent to the opposite end 112 and inclined to the central axis CA. When the attachment tube 100A1 is viewed from the side, the inclined surface 140 is inclined at an acute angle A1 with respect to the central axis CA of the attachment tube 100A1. In one embodiment, the acute angle A1 of the inclined surface 140 is 25 degrees or more and 45 degrees or less. The inclined surface 140 has a shape which is made by excluding the rectangular shape of the second insertion opening 130A from an imaginary sectional shape of the tubular body which is viewed when a section is taken at the acute angle A1 from the tubular body 110A1 with respect to the central axis CA. Thus, the inclined surface 140 has a straight edge 142 and a curved edge 143 which is located opposite the straight edge 142. The straight edge 142 of the inclined surface 140 adjoins the outer edge of the lower long side portion 112LLS of the opposite end 112. The lower long side portion 112LLS has the lower long side 131LLS of the second insertion opening 130A (the long side close to the central axis CA among two long sides of the second insertion opening) as its inner edge. The curved edge 143 of the inclined surface 140 adjoins the outer circumferential surface of the cylindrical surface of the attachment tube 100A1. The curved edge 143 of the inclined surface 140 has an apex point AP which is located on the lower edge 113L when the attachment tube 100A1 is viewed from the side.

A length which is indicated by a symbol PL in FIG. 5 shows a maximum insertion depth of the tip portion 13 of the fishing rod which is inserted to the attachment tube 100A1. In one embodiment, to ensure an appropriate attachment strength between the tip portion 13 of the fishing rod and the attachment tube 100A1, the length PL is 60% or more and 95% or less of an overall length OL of the attachment tube 100A1 (a distance from the one end 111 to the opposite end 112).

FIGS. 7A to 12B show various examples of the attachment tube. The attachment tube 100A2 shown in FIGS. 7A and 7B has the second insertion opening 130A, which is the same as the second insertion opening 130A of the attachment tube 100A1, however includes a tubular body 110A2 which has an outer diameter less than the outer diameter of the tubular body 110A1 of the attachment tube 100A1. The attachment tube 100A3 shown in FIGS. 8A and 8B has the second insertion opening 130A, which is the same as the second insertion opening 130A of the attachment tube 100A1, however includes a tubular body 110A3 which has an outer diameter greater than the outer diameter of the tubular body 110A1 of the attachment tube 100A1. As shown in FIG. 8B, an opposite end portion of the attachment tube 100A3 becomes gradually narrower toward the opposite end 112.

Figure 9A:
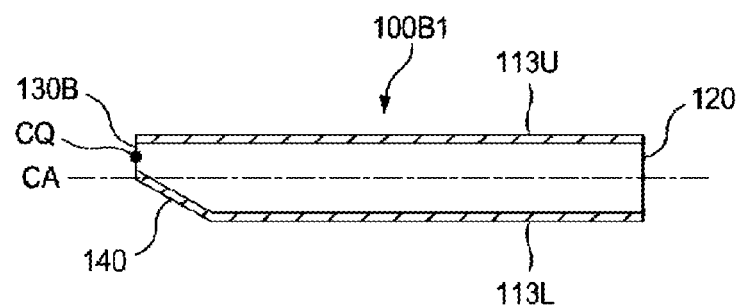
FIG. 9A is a longitudinal sectional view showing still another example of an attachment tube.
Figure 9B:
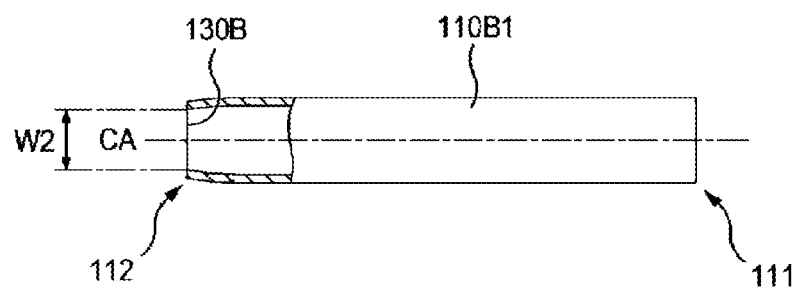
FIG. 9B is a top view of the attachment tube shown in FIG. 9A.
Figure 10A:
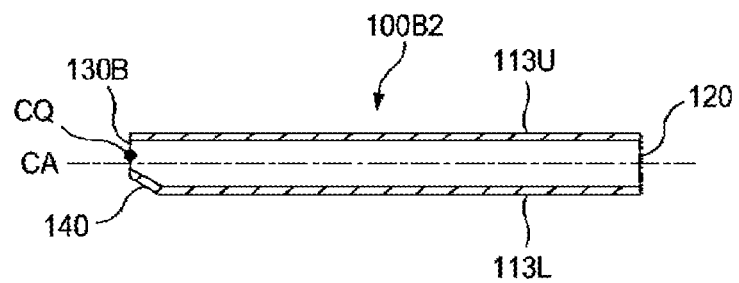
FIG. 10A is a longitudinal sectional view showing yet still another example of an attachment tube.
Figure 10B:
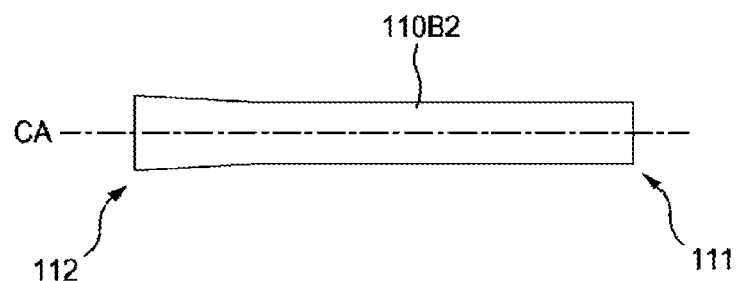
FIG. 10B is a top view of the attachment tube shown in FIG. 10A.
Figure 11A:
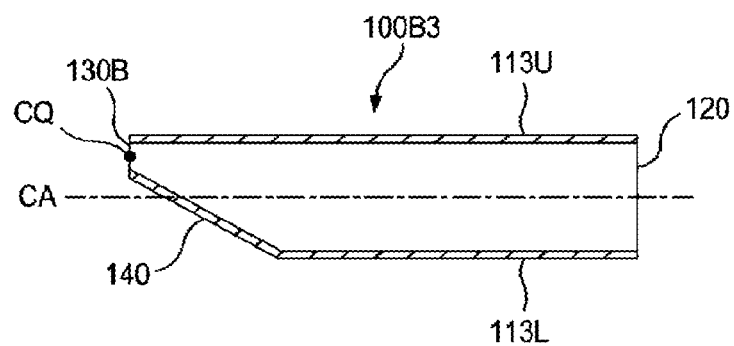
FIG. 11A is a longitudinal sectional view showing a further example of an attachment tube.
Figure 11B:
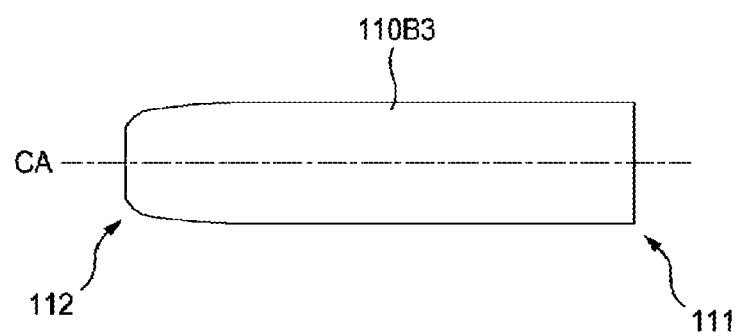
FIG. 11B is a top view of the attachment tube shown in FIG. 11A.

The attachment tube 100B1 shown in FIGS. 9A and 9B has the tubular body 110B1, which has the same outer diameter as the tubular body of the attachment tube 100A1, however includes a second insertion opening 130B which has a width W2 less than the width W1 of the second insertion opening 130A of the attachment tube 100A1. The attachment tube 100B2 shown in FIGS. 10A and 10B has the second insertion opening 130B, which is the same as the second insertion opening 130B of the attachment tube 100B1, however includes a tubular body 110B2 which has an outer diameter less than the outer diameter of the tubular body 110B1 of the attachment tube 100B1. The tubular body 110B3 of the attachment tube 100B3 shown in FIGS. 11A and 11B has an outer diameter greater than the outer diameter of the tubular body of the attachment tube 100B1. However, the attachment tube 100B3 has the second insertion opening 130B, which is the same as the second insertion opening 130B of the attachment tube 100B1. As shown in FIG. 11B, an opposite end portion of the attachment tube 100B3 becomes gradually narrower toward the opposite end 112.

In the attachment tubes shown in FIGS. 7A to 11B, the rectangle center CQ of the second insertion opening is spaced upward apart from the central axis CA of the attachment tube. In the attachment tubes 100A2, 100B2 shown in FIGS. 7A, 7B, 10A and 10B, the lower long side 131LLS of the second insertion opening is located below the central axis CA. Further, in the attachment tubes 100A3, 100B3 shown in FIGS. 8A, 8B, 11A and 11B, the lower long side 131LLS of the second insertion opening is located above the central axis CA. Further, in the attachment tubes 100A3, 100B3 shown in FIGS. 8A, 8B, 11A and 11B, a distance between both short sides 131LSS, 131RSS of the second insertion opening 130A, 130B is less than the inner diameter of the tubular body 110A3, 110B3 (the inner diameter of the attachment tube). Thus, when the attachment tubes 100A3, 100B3 shown in FIGS. 8A, 8B, 11A and 11B are viewed from the front, the left short side 131LSS and the right short side 131RSS of the second insertion opening is located inside the outer surface of the cylindrical portion of the attachment tube 100A3, 100B3.

Figure 12A:
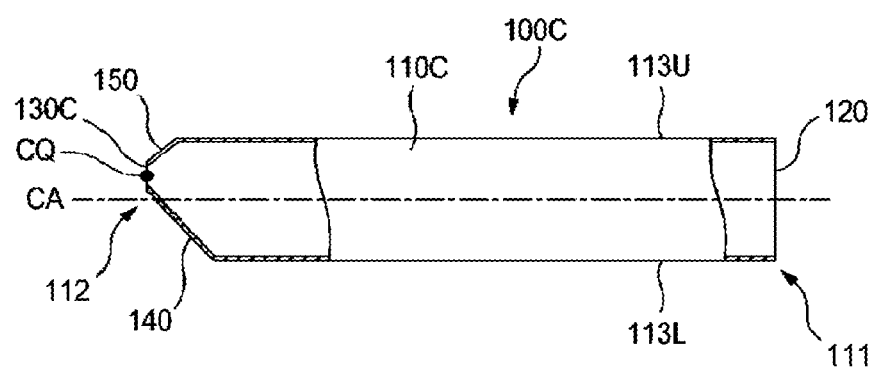
FIG. 12A is a side view showing yet a further example of an attachment tube.
Figure 12B:
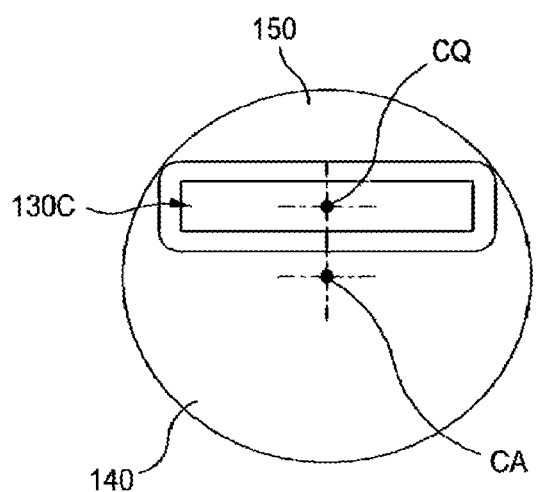
FIG. 12B is a front view of the attachment tube shown in FIG. 12A.

The attachment tube 100C shown in FIGS. 12A and 12B includes a second insertion opening 130C which has a width different from the width of the second insertion opening 130A of the attachment tube 100A1. Further, the attachment tube 100C includes another inclined surface 150 which adjoins the upper long side 131ULS of the second insertion opening 130C and is inclined with respect to the central axis CA in a direction opposite to the inclined surface 140. The rectangle center CQ of the second insertion opening 130C of the attachment tube 100C is spaced upward apart from the central axis CA, and the lower long side 131LLS of the second insertion opening 130C is located above the central axis CA.

An example of the frame of the top guide is described with reference to FIGS. 2 to 5, 13 and 14.

The frame 200A of the top guide retains a guide ring 300. The frame 200A is coupled to the attachment tube 100A1 to 100C and supports the guide ring 300. In this embodiment, the guide ring 300 is circular and has a circular opening, through which a fishing line passes, therein. The guide ring 300 makes contact with the fishing line at an inner circumferential surface thereof. The guide ring 300 is made of a hard material such as ceramic.

The frame 200A includes a ring retaining portion 210 which retains the guide ring 300, an insertion leg 220A which extends from the ring retaining portion 210 and is fitted to the second insertion opening 130A, 130B, 130C of the attachment tube 100A1 to 100C, and a support leg 230 which extends from the ring retaining portion 210 and makes contact with the outer surface of the attachment tube 100A1 to 100C.

The ring retaining portion 210 has a ring shape which is formed with a circular opening such that the ring retaining portion 210 retains the guide ring 300 throughout the outer circumferential surface of the guide ring. The guide ring 300 is fitted to the inner circumferential surface of the ring retaining portion 210 at the outer circumferential surface of the guide ring.

Figure 14:
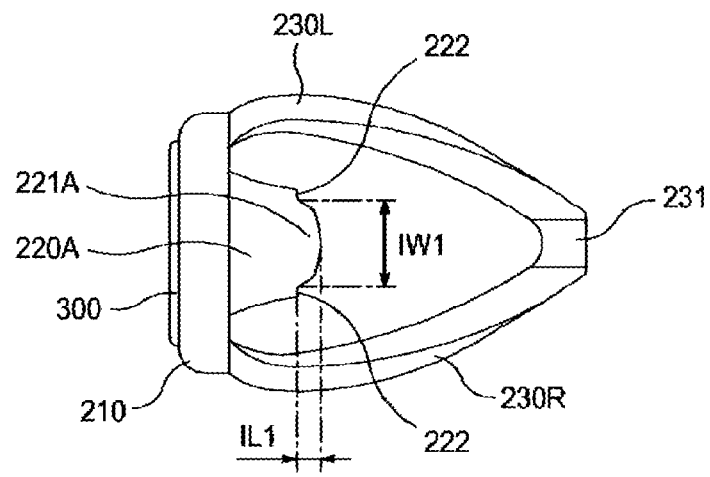
FIG. 14 is a top view of the frame shown in FIG. 2.

The insertion leg 220A extends approximately straight from a lower end of the ring retaining portion 210 and is inclined from the ring retaining portion 210 at an acute angle with respect to a plane RP of the guide ring 300. Said acute angle of the insertion leg 220A may be the same as the acute angle A1 of the inclined surface 140 of the attachment tube 100A1 to 100C. The insertion leg 220A has, at its distal end, an insertion portion 221A which is fitted to the second insertion opening 130A, 130B, 130C of the attachment tube 100A1 to 100C. In this embodiment, as shown in FIG. 14, the insertion portion 221A is defined by a pair of shoulder portions 222 which are formed at lateral edges of the insertion leg 220A. The insertion portion 221A has an insertion length IL1, which corresponds to a distance from the shoulder portion 222 to the distal end of the insertion leg 220A, and an insertion width IW1, which corresponds to a distance between both shoulder portions 222. In one embodiment, the insertion width IW1 of the insertion portion 221A is the same as the width W1 of the second insertion opening 130A. Further, a width of each shoulder portion 222 may be equal to the thickness of the short side portion 112LSS, 112RSS of the opposite end 112 or may be less than the thickness of the short side portion 112LSS, 112RSS.

The support leg 230 extends from the lateral side of the ring retaining portion 210 toward the butt of the fishing rod 10. In this embodiment, the support leg 230 comprises a left support leg 230L and a right support leg 230R which are symmetrical with respect to the central axis CA of the attachment tube. When the top guide 20A1 is viewed from the side, the left support leg 230L and the right support leg 230R are curved downwardly convexly. The left support leg 230L and the right support leg 230R are integrated together at their distal ends to form a distal end portion 231 of the support leg 230. The distal end portion 231 of the support leg 230 makes contact with the outer surface of the attachment tube 100A1 to 100C in the direction in which the rectangle center CQ of the second insertion opening is spaced apart from the central axis CA of the attachment tube.

Figure 15:
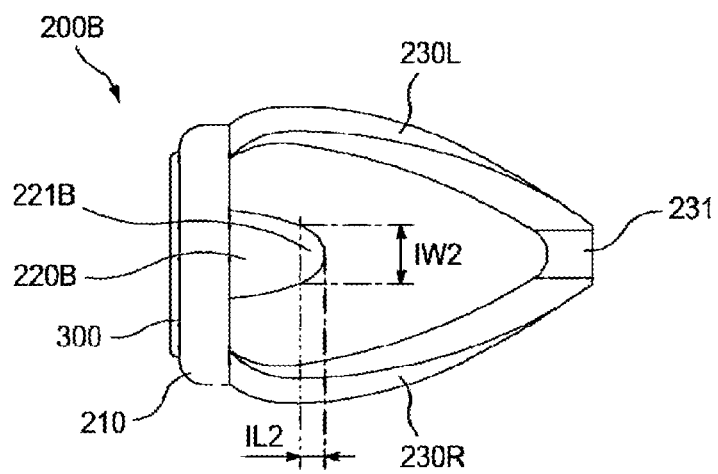
FIG. 15 is a top view showing another example of a frame.

FIG. 15 shows the frame according to another example. An insertion leg 220B of the frame 200B shown in FIG. 15 includes, at its distal end, an insertion portion 221B which has an approximately parabolic shape when the frame 200B is viewed from the top. The insertion portion 221B of the insertion leg 220B is fitted to the second insertion opening 130A, 130B, 130C. The insertion portion 221B has an insertion length IL2 and an insertion width IW2. In one embodiment, the insertion width IW2 of the insertion portion 221B is equal to the width W2 of the second insertion opening 130B.

Figure 16:
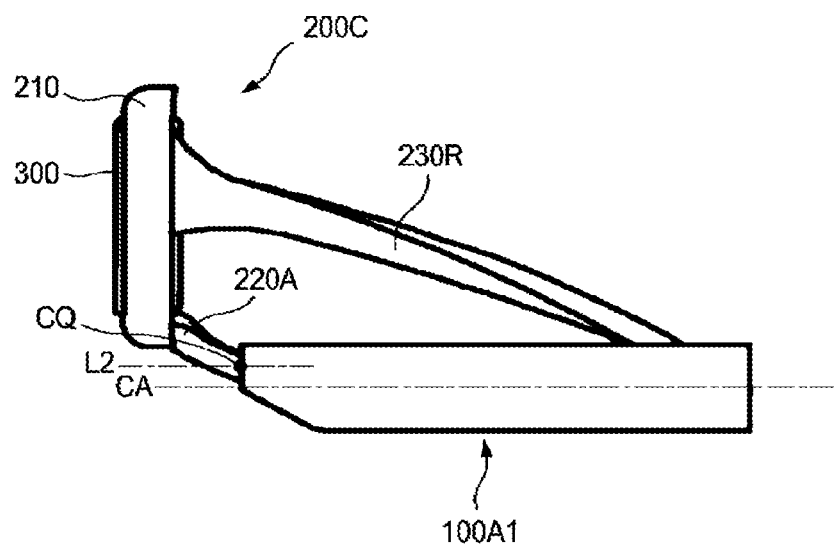
FIG. 16 is a side view showing yet another example of a frame.
Figure 17:
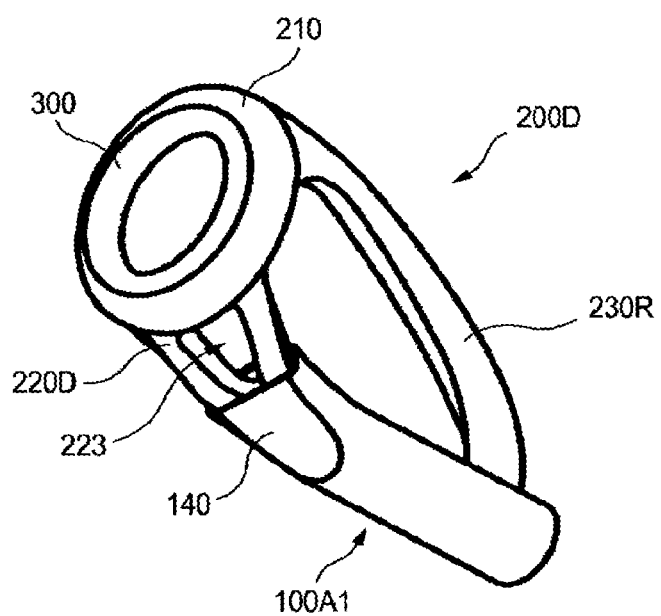
FIG. 17 is a perspective view showing still another example of a frame.
Figure 18:
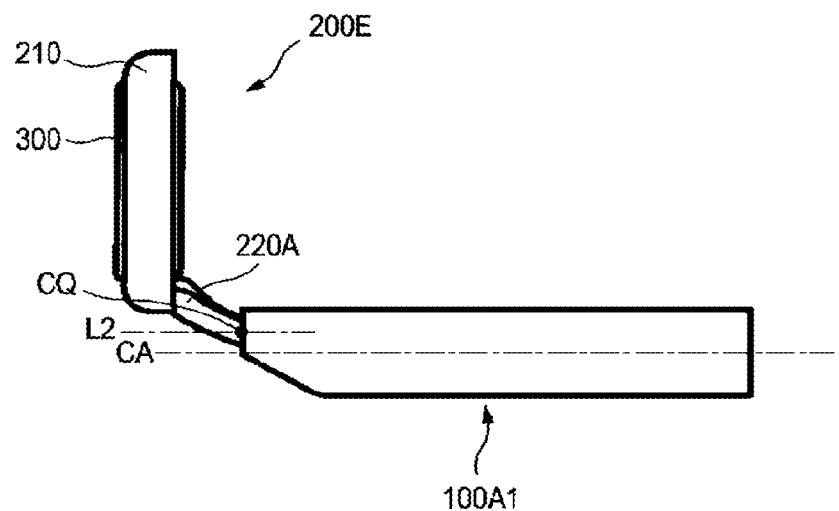
FIG. 18 is a side view showing yet still another example of a frame.

FIGS. 16 to 18 show various examples of the frame. When the top guide is viewed from the side, the left support leg 230L and the right support leg 230R, which constitute the support leg 230 of the frame 200C shown in FIG. 16, are curved upwardly convexly. The frame 200D shown in FIG. 17 includes an opening 223 in an insertion leg 220D. The frame 200E shown in FIG. 18 does not include the above-described support leg 230.

The frame 200A to 200D is attached to the attachment tube 100A1 to 100C by inserting the insertion portion 221A, 221B of the insertion leg 220A, 220B, 220D of the frame to the second insertion opening 130A, 130B, 130C and bringing the distal end portion 231 of the support leg 230 into contact with the outer surface of the attachment tube. To firmly fix the frame to the attachment tube, the distal end portion 231 of the support leg 230 is bonded to the outer surface of the attachment tube by means of, for example, brazing or soldering.

Descriptions are made with reference to FIGS. 19 to 22 as to an example where the frames are maintained at the same position with respect to various attachment tubes in the top guides including the above-described attachment tubes and frames.

Figure 19:
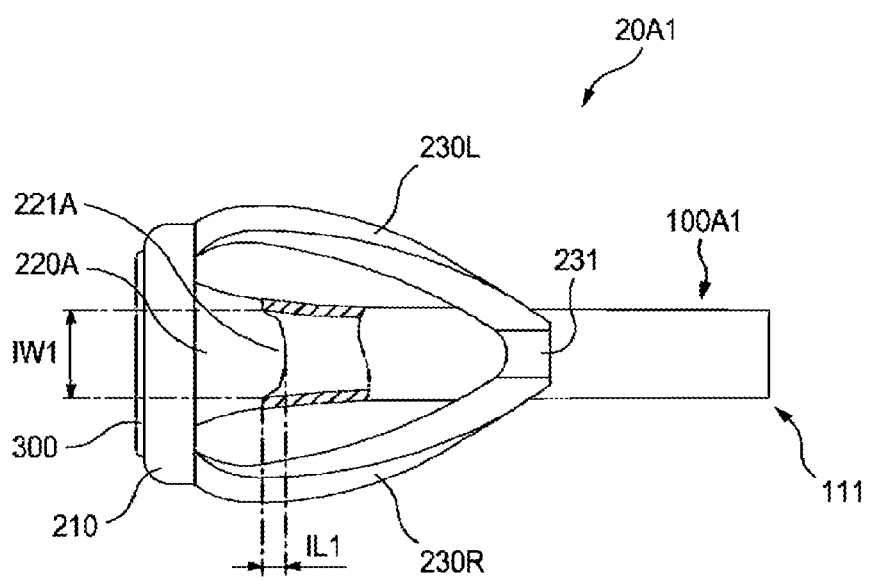
FIG. 19 is a top view of a top guide according to one embodiment, showing that an insertion leg of a frame is inserted to a second insertion opening of an attachment tube.
Figure 20:
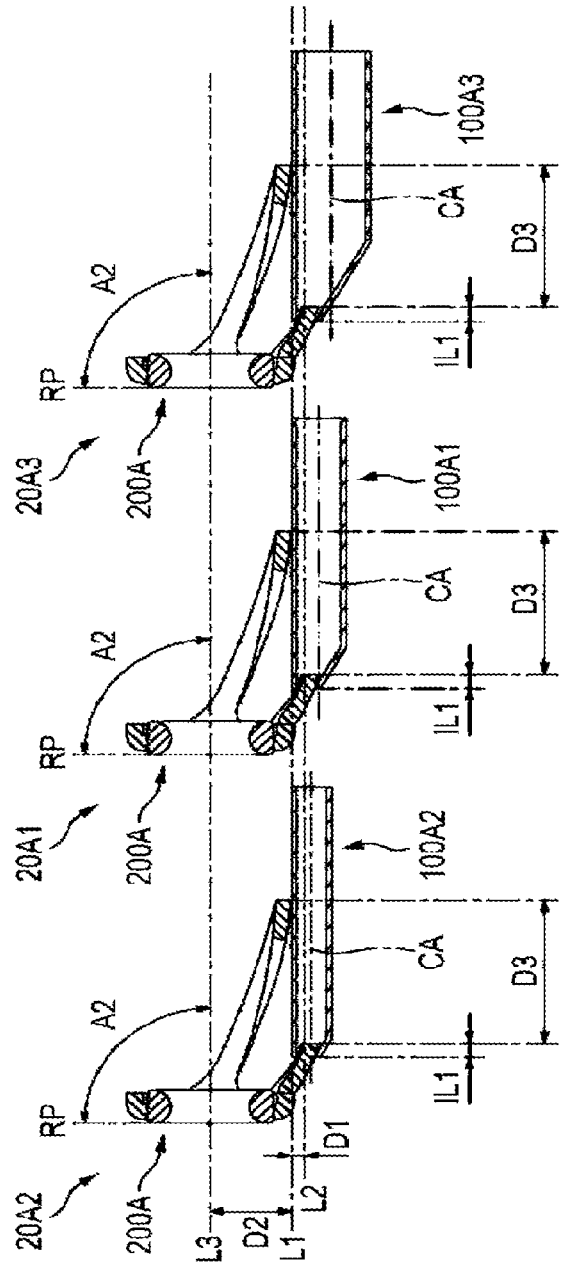
FIG. 20 shows in parallel various embodiments of a top guide wherein a frame is mounted to attachment tubes having various outer diameters.

FIG. 19 is a top view of the top guide 20A1 which includes the frame 200A among the above-described frames and the attachment tube 100A1 among the above-described attachment tubes. FIG. 20 shows in parallel that the frame 200A is attached to the respective attachment tubes 100A1, 100A2, 100A3. As shown in FIG. 20, the attachment tubes 100A1, 100A2, 100A3 have outer diameters different from one another. However, a distance D1 between the straight line L1, which passes the upper edge 113U of the attachment tube 100A1, 100A2, 100A3 and is parallel with the central axis CA, and the straight line L2, which passes the rectangle center CQ of the second insertion opening 130A and is parallel with the central axis CA, is the same in each top guide 20A1, 20A2, 20A3.

The insertion width IW1 of the frame 200A is equal to the width W1 of the second insertion opening 130A, and the insertion portion 221A is inserted to the second insertion opening 130A at the same insertion length IL1 in each attachment tube 100A1, 100A2, 100A3. Further, a distance D2 between the straight line L1 parallel with the central axis CA and a straight line L3, which passes a center of the guide ring 300 and is parallel with the central axis CA, is also the same in each top guide 20A1, 20A2, 20A3. Further, an angle A2, which is formed between the plane RP of the guide ring 300 and the central axis CA of the attachment tube 100A1, 100A2, 100A3, is the same in each top guide 20A1, 20A2, 20A3. Further, a distance D3 between a tip end of the insertion portion 221A and a rear end of the distal end portion 231 of the support leg 230 is also the same in each top guide 20A1, 20A2, 20A3. As described above, in the top guides 20A1, 20A2, 20A3 according to the embodiments, the frame 200A is maintained at the same position with respect to the attachment tubes 100A1, 100A2, 100A3 which have outer diameters different from one another.

Figure 21:
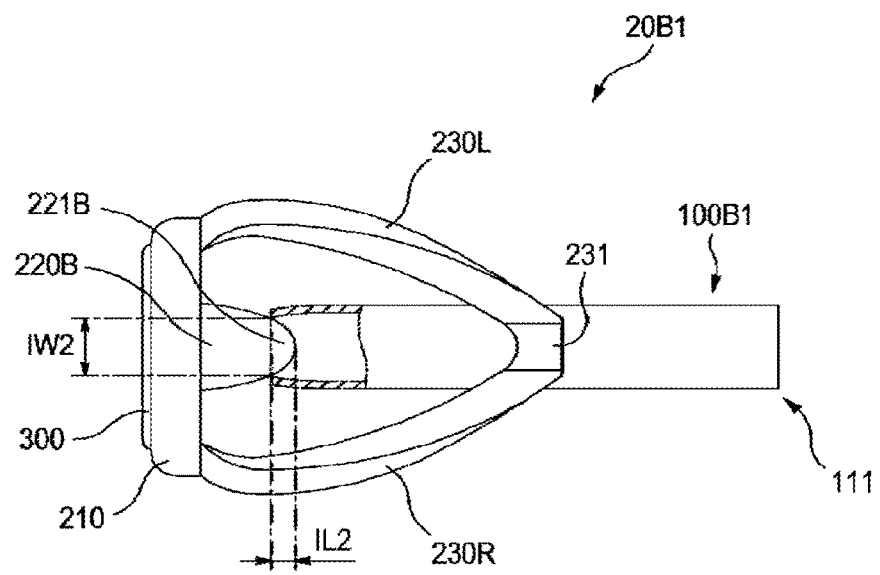
FIG. 21 is a top view of a top guide according to another embodiment, showing that an insertion leg of a frame is inserted to a second insertion opening of an attachment tube.
Figure 22:
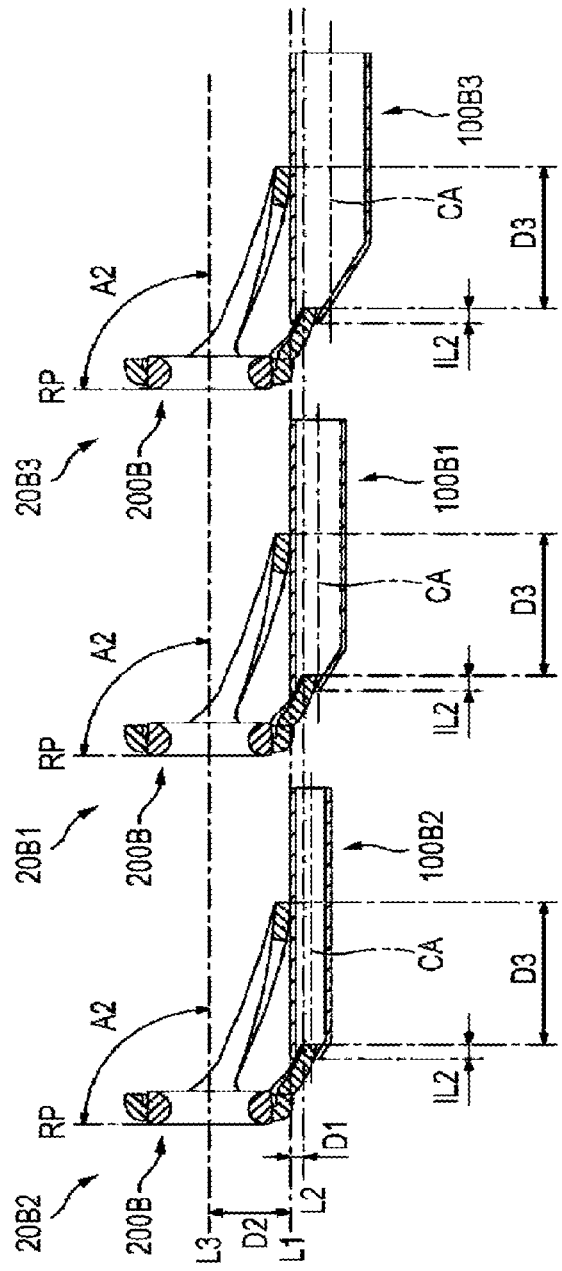
FIG. 22 shows in parallel various embodiments of a top guide wherein a frame is mounted to attachment tubes having various outer diameters.

FIG. 21 is a top view of the top guide 20B1 which includes the frame 200B among the above-described frames and the attachment tube 100B1 among the above-described attachment tubes. FIG. 22 shows in parallel that the frame 200B is attached to the respective attachment tubes 100B1, 100B2, 100B3. As shown in FIG. 22, the outer diameters of the respective attachment tubes 100B1, 100B2, 100B3 are different. However, the distance D1 between the straight line L1, which passes the upper edge 113U of the attachment tube 100B1, 100B2, 100B3, and the straight line L2, which passes the center of the second insertion opening 130B, is the same in each top guide 20B1, 20B2, 20B3. The insertion width IW2 of the insertion portion 221B of the frame 200B is the same as the width W2 of the second insertion opening 130B, and the insertion portion 221B is inserted at the same insertion length IL2 in each attachment tube 100B1, 100B2, 100B3. Further, in each top guide 20B1, 20B2, 20B3, the distance D2 from the straight line L1 to the straight line L3 is also the same and the angle A2 of the plane RP of the guide ring 300 is also the same. Further, the distance D3 between a tip end of the insertion portion 221B and the rear end of the distal end portion 231 of the support leg 230 is also the same in each top guide 20B1, 20B2, 20B3. As described above, in the top guides 20B1, 20B2, 20B3 according to the embodiments, the frame 200B is maintained at the same position with respect to the attachment tubes 100B1, 100B2, 100B3 which have outer diameters different from one another.

Figure 13:
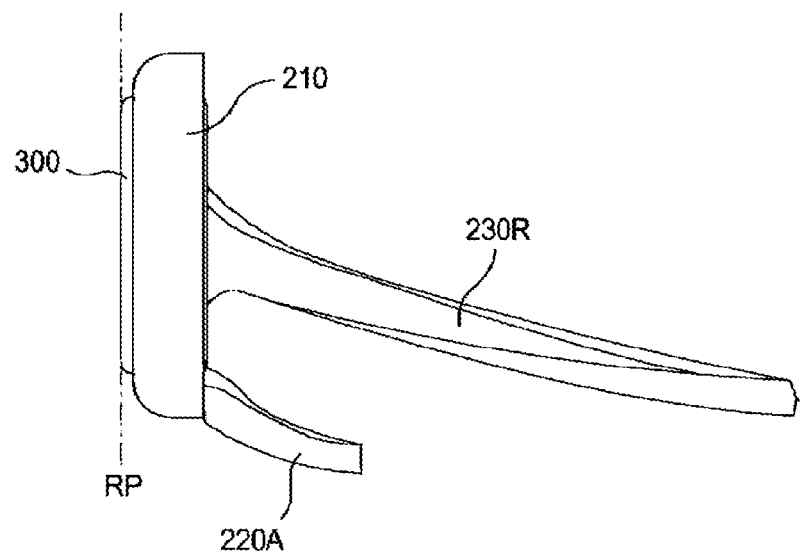
FIG. 13 is a side view of a frame shown in FIG. 2.

In the top guides 20A1 to 20B3 according to the embodiments, the insertion portion 221A of the frame 200A is inserted to the attachment tubes 100A1 to 100A3 at the same insertion width IW1 and at the same insertion length IL1, and the insertion portion 221B of the frame 200B is inserted to the attachment tubes 100B1 to 100B3 at the same insertion width IW2 and at the same insertion length IL2. Further, the rectangle center of the second insertion opening 130A, 130B, 130C is located above the central axis CA of the attachment tube 100A1 to 100C, and the outer edge of the upper long side portion 112ULS of the opposite end 112, which defines the upper long side of the second insertion opening 130A, is located on the straight line L1 which is located at the outer surface of the attachment tube (the upper edge 113U of the attachment tube when the attachment tube is viewed from the side). Thus, the frame 200A, 200B is maintained at the same position with respect to each attachment tube 100A1 to 100C. Further, as the frame 200A, 200B is maintained at the same position with respect to each attachment tube, the distance D3 between the tip end of the insertion portion 221A, 221B and the rear end of the distal end portion 231 of the support leg 230 is also the same in each top guide. Accordingly, as shown in FIGS. 13 to 15, the insertion portion 221A, 221B of the frame 200A, 200B can be designed to have a relatively short length, and the support leg 230 of the frame 200A, 200B can be also designed to be short accordingly. Consequently, the top guides 20A1 to 20B3 according to the embodiments can be reduced in weight.

In the top guides 20A1 to 20B3 according to the embodiments, the inclined surface 140 of the attachment tube 100A1 to 100B3 is inclined at the acute angle A1 (e.g. 25 degrees to 45 degrees) with respect to the central axis CA. Further, the insertion leg 220A, 220B of the frame 200A, 200B linearly extends from the ring retaining portion 210 and is inclined at the same angle as the acute angle A1 of the inclined surface 140 with respect to the plane RP of the guide ring. In one embodiment, the insertion leg 220A, 220B of the frame 200A, 200B extends from the ring retaining portion 210 at the same angle as the acute angle A1 of the inclined surface 140 of the attachment tube. Thus, when the top guide 20A1 to 20B3 is viewed from the side, a lower edge of the insertion leg 220A, 220B and the inclined surface 140 form a straight line. Thus, as shown in FIGS. 20 and 22, in the top guides 20A1 to 20B3 according to the embodiments, an angle which the inclined surface 140 and a lower surface of the insertion leg 220A, 220B make with respect to the central axis CA becomes large, and a step difference between the inclined surface 140 and the lower surface of the insertion leg 220A, 220B becomes small. Accordingly, a fishing line is not caught or entangled at the intersection between the insertion leg 220A, 220B of the frame and the inclined surface 140 of the attachment tube.

Figure 23A:
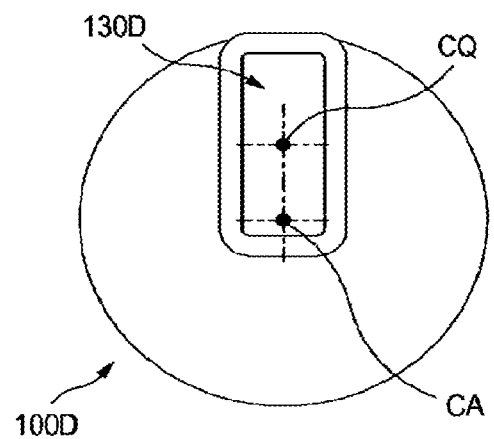
FIG. 23A shows another example of a rectangle shape of a second insertion opening.
Figure 23B:
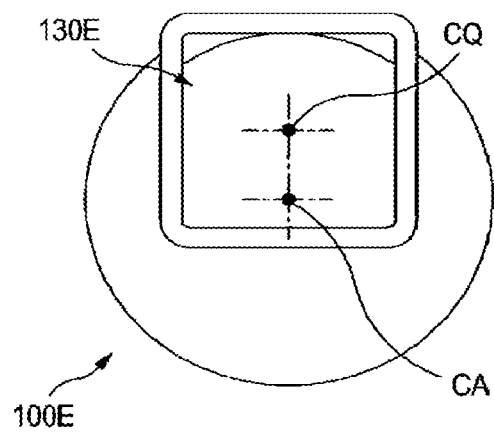
FIG. 23B shows yet another example of a rectangle shape of a second insertion opening.

The above-described embodiments include the attachment tube 100A1 to 100C having the second insertion opening 130A, 130B which is laterally long when the attachment tube 130A1 to 100C is viewed from the front. In another embodiment, as shown in FIG. 23A, a second insertion opening 130D, which is rectangular and vertically long when an attachment tube 100D is viewed from the front, may be provided at the opposite end of the attachment tube 100D. In a further another embodiment, as shown in FIG. 23B, a square, second insertion opening 130E may be provided at the opposite end 112 of the attachment tube 100E. In such embodiments, the rectangle center of the second insertion opening 130D or the square center of the second insertion opening 130E is spaced upward apart from the central axis CA of the attachment tube, and when the attachment tube is viewed from the side, the edge of the attachment tube in the direction in which the center of the second insertion opening is spaced is a straight line.

The present disclosure described heretofore should not be limited to the above-described embodiments and the accompanying drawings. It will be apparent to those of ordinary skill in the technical field to which the present disclosure pertains, that various substitutions, modifications and alternations may be made without departing from the technical idea of the present disclosure.

DESCRIPTION OF REFERENCE SYMBOLS 10 fishing rod, 11 rod body, 12 reel seat, 13 tip portion of fishing rod, 20A1, 20A2, 20A3, 20B1, 20B2, 20B3 top guide, 100A1, 100A2, 100A3, 100B1, 100B2, 100B3, 100C, 100D, 100E attachment tube, 110A1, 110A2, 110A3, 110B1, 110B2, 110B3 tubular body, 111 one end of attachment tube, 112 opposite end of attachment tube, 112ULS, 112LLS long side portion of opposite end, 112LSS, 112RSS short side portion of opposite end, 113U upper edge when attachment tube is viewed from side, 113L lower edge when attachment tube is viewed from side, 120 first insertion opening, 130A, 130B, 130C, 130D, 130E second insertion opening, 131ULS, 131LLS long side of second insertion opening, 131LSS, 131RSS short side of second insertion opening, 140 inclined surface, 141 inclined surface portion, 142 straight edge of inclined surface, 143 curved edge of inclined surface, 150 inclined surface, 200A, 200B, 200C, 200D, 200E frame, 210 ring retaining portion, 220A, 220B, 220D insertion leg, 221A, 221B insertion portion, 222 shoulder portion, 223 opening, 230 support leg, 230L left support leg, 230R right support leg, 231 distal end portion, 300 guide ring, CA central axis of attachment tube, CQ quadrilateral center of second insertion opening, L1 straight line located on outer surface of attachment tube and parallel with central axis, L2 straight line passing quadrilateral center of second insertion opening and parallel with central axis, L3 straight line passing center of guide ring and parallel with central axis, OL overall length of attachment tube, PL length between apex point of edge of inclined surface and one end, W1, W2 width of second insertion opening, D1 distance between L1 and L2, D2 distance between L1 and L3, D3 distance between tip end of insertion portion and rear end of distal end portion, IW1, IW2 insertion width of insertion portion, IL1 IL2 insertion length of insertion portion, A1 angle of inclined surface with respect to central axis, A2 angle of plane of guide ring with respect to central axis, AP apex point of curved edge of inclined surface, RP plane of guide ring.

What is claimed is:

1. An attachment tube for a top guide, comprising:
a central axis extending in a longitudinal direction of the attachment tube;
a first insertion opening provided at one end of the attachment tube in the longitudinal direction, a tip portion of a fishing rod being inserted into the first insertion opening;
a quadrilateral second insertion opening formed at an opposite end of the attachment tube located opposite to the one end in the longitudinal direction and having a center spaced apart from the central axis in an upward direction, an insertion leg of a frame supporting a guide ring being inserted into the quadrilateral second insertion opening; and
an inclined surface provided at the opposite end, the inclined surface being inclined at an acute angle with respect to the central axis,
wherein the opposite end has an upper side portion, a lower side portion, a left side portion and a right side portion which form a quadrilateral shape,
wherein inner edges of the upper side portion, the lower side portion, the left side portion and the right side portion define respective sides of a quadrilateral shape of the second insertion opening,
wherein the inclined surface has a straight edge which adjoins an outer edge of the lower side portion, and a curved edge which is located opposite the straight edge, and
wherein the quadrilateral second insertion opening is formed on the opposite end of the attachment tube such that, when the insertion leg of the frame supporting the guide ring is inserted into the quadrilateral second insertion opening, the insertion leg extends in the longitudinal direction of the attachment tube offset from the central axis.

2. The attachment tube for a top guide of claim 1, wherein when the attachment tube is viewed from a side of the attachment tube, an edge in a direction in which the center of the second insertion opening is spaced apart from the central axis is straight.

3. The attachment tube for a top guide of claim 1, wherein the acute angle of the inclined surface is in a range of 25 to 45 degrees.

4. The attachment tube for a top guide of claim 1, wherein a length between the one end and an apex point of the curved edge of the inclined surface is in a range of 60% to 95% of a length between the one end and the opposite end.

5. The attachment tube for a top guide of claim 1, wherein the second insertion opening is rectangular.

6. The attachment tube for a top guide of claim 5, the second insertion opening including short sides, wherein when the attachment tube is viewed from a front of the attachment tube, a distance between the short sides of the second insertion opening is greater or less than an inner diameter of the attachment tube.

7. A top guide for a fishing rod, comprising:
a frame including a ring retaining portion retaining a guide ring through which a fishing line passes, an insertion leg extending from the ring retaining portion; and
the attachment tube for a top guide of claim 1.

8. The top guide for a fishing rod of claim 7, wherein when the top guide for a fishing rod is viewed from a side of the attachment tube, the insertion leg of the frame extends from the ring retaining portion at the same angle as the acute angle of the inclined surface of the attachment tube.

9. The top guide for a fishing and of claim 7, wherein the frame further includes at least one support leg which extends from the ring retaining portion and makes contact with an outer surface of the attachment tube.

10. The top guide for a fishing rod of claim 9, wherein the at least one support leg makes contact with the outer surface of the attachment tube in a direction in which the center of the second insertion opening is spaced apart from the central axis of the attachment tube.

11. A fishing rod including the top guide for a fishing rod of claim 7.

12. A fishing rod including the attachment tube for a top guide of claim 1.

13. An attachment tube for a top guide, comprising:
a central axis extending in a longitudinal direction of the attachment tube;
a first insertion opening provided at one end of the attachment tube in the longitudinal direction, a tip portion of a fishing rod being inserted into the first insertion opening;
a quadrilateral second insertion opening formed at an opposite end of the attachment tube located opposite to the one end in the longitudinal direction and having a center spaced apart from the central axis in an upward direction; and
an inclined surface provided at the opposite end, the inclined surface being inclined at an acute angle with respect to the central axis; and
an insertion leg of a frame supporting a guide ring being inserted into the quadrilateral second insertion opening,
wherein the quadrilateral second insertion opening is formed on the opposite end of the attachment tube such that, when the insertion leg of the frame supporting the guide ring is inserted into the quadrilateral second insertion opening, the insertion leg extends in the longitudinal direction of the attachment tube offset from the central axis.

14. An attachment tube for a top guide, comprising:
a central axis extending in a longitudinal direction of the attachment tube;
a first insertion opening provided at one end of the attachment tube in the longitudinal direction, a tip portion of a fishing rod being inserted into the first insertion opening;
a quadrilateral second insertion opening formed at an opposite end of the attachment tube located opposite to the one end in the longitudinal direction and having a center spaced apart from the central axis in an upward direction; and
an insertion leg of a frame supporting a guide ring being inserted into the quadrilateral second insertion opening,
wherein the quadrilateral second insertion opening is formed on the opposite end of the attachment tube such that, when an insertion leg of a frame supporting a guide ring is inserted into the quadrilateral second insertion opening, the insertion leg extends in the longitudinal direction of the attachment tube offset from the central axis.

* * * * *